April 18, 1950     M. LEVINSON     2,504,551
ORNAMENTAL HANDBAG
Filed March 3, 1947
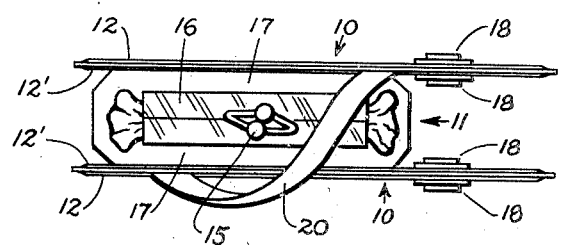
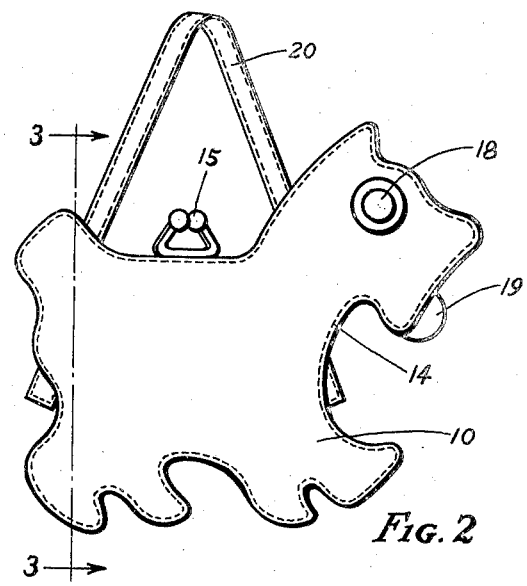
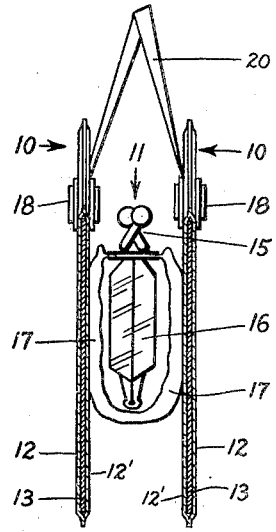
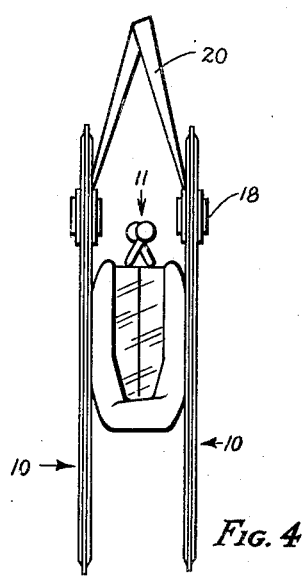
INVENTOR
Max Levinson
BY Carlton B. Pitchett
AGENT Patented Apr. 18, 1950

2,504,551

UNITED STATES PATENT OFFICE 2,504,551

ORNAMENTAL HANDBAG

Max Levinson, Newburgh, N. Y.

Application March 3, 1947, Serial No. 732,082

5 Claims. (Cl. 150—28)

This invention relates to handbags and, in particular to novelty handbags suitable for use by small girls.

It is an object of the invention to provide an ornamental handbag of durable construction which will be attractive to a small girl and, at the same time, efficiently serve the purpose for which it is intended.

It is another object of the invention to provide a handbag which will remain in an upright position, whether the bag be opened or closed, when placed on a substantially flat and horizontal surface.

It is a further object of the invention to provide a handbag in accordance with the above objects which will be simple and easy to manufacture at low cost.

One form of the invention is illustrated in the accompanying drawing in which Figure 1 is a top view of a handbag constructed in accordance with this invention;

Figure 2 is a side view of the same;

Figure 3 is a cross-sectional view of the handbag taken on line 3—3 of Fig. 2; and Figure 4 is an end view of the same.

A handbag in accordance with this invention comprises a top-opening rigid-jaw purse on each side of which reinforced felt panels shaped to have the appearance of an animal are mounted. The pedal extremities of the simulated animal are cut along a common plane so that they will contact a substantially flat surface, and, by means of the reinforcement, the side panels are stiffened sufficiently to enable the handbag to remain upright when the purse is open or closed and the same is placed on a substantially flat horizontal surface.

For a better understanding of the invention, reference may be had to the drawing in which the reinforced felt panels are indicated generally at 10 and the top opening purse at 11.

Each animal simulating side panel 10, shown in the drawing in the shape of a dog for the purposes of illustration only and not by way of limitation, is made up of two strips of felt 12 and 12' cut in the shape of a silhouette of the simulated animal and a reinforcing or stiffening liner 13, such as cardboard, of similar configuration arranged between them. The strips of felt 12 and 12' and the stiffening liner 13 are sewed together about the periphery of the animal silhouette as indicated at 14.

The top-opening purse portion 11 of the handbag as shown in Figure 3, consists of a snap catch 15, hinged metal jaws 16, and flexible side portions 17.

Each animal panel 10 is affixed to one of the flexible side portions 17 of the purse by staples or sewing in such manner as to conceal the fastening means from outside view. This is accomplished by stapling or sewing the stiffening liner 13 and the inside felt strips 12' of the panels 10 to the adjoining flexible side portions 17 of the purse. The outside felt strip 12 of the simulated animal is then placed on the stiffening liner 13. The edges of the animal simulating panels 10 are then sewed and the short dash lines 14 shown in Figure 2 indicate the sewing stitches.

The eyes 18 on each side of the animal panels 10 consist of contrasting color felt circles glued one upon the other and then upon each outer felt strip 12.

The tongue 19 is a piece of contrasting color felt inserted between the felt strips 12 and 12' and held in place by the stitching 14.

For convenience in carrying, a flexible strap-type handle 20 may be arranged with each end thereof attached to one of the animal panels 10 as shown in Figures 1 and 2.

I claim:

1. An ornamental handbag comprising a top-opening purse having a rigid-jaw structure and flexible side portions, the said side portions of the purse being affixed to and supported between two panels having the appearance of an animal, each panel consisting of an inner and outer felt strip reinforced and stiffened by an intermediate liner of stiff and flexible material, and carrying means comprising a flexible strap-type handle having each end thereof attached to one of the panels.

2. An ornamental handbag according to claim 1 in which the two animal simulating support panels are cut with the pedal extremities of the simulated animal arranged in a substantially straight line, the combination of the two panels and their arrangement with respect to the said purse being such as to support the purse in an upright and elevated position when the pedal extremities of the animal simulating panels rest on a substantially flat and horizontal surface.

3. An ornamental handbag according to claim 1 in which additional circular felt strips representative of the eyes of the simulated animal are affixed to each side of the said panels.

4. An ornamental handbag according to claim 1 in which an additional felt strip representative of the tongue of the simulated animal is affixed between the edges of the felt strips of each of the said panels.

5. An ornamental handbag comprising a purse having a rigid jaw structure and flexible side portions, the purse being supported on both sides by animal simulating panels, each of said panels consisting of inner and outer felt strips reinforced and stiffened by an intermediate liner of stiff and flexible material, the combination and arrangement of the lower edges of the supporting panels causing the handbag to retain its upright position when placed on a substantially flat and horizontal surface.

MAX LEVINSON.

REFERENCES CITED

The following references are of record in the file of this patent:

UNITED STATES PATENTS

| Number | Name | Date |
| --- | --- | --- |
| D. 74,108 | Heard | Dec. 20, 1927 |
| D. 75,491 | Hammerling | June 12, 1928 |
| 1,630,844 | Hall | May 31, 1927 |
| 1,638,594 | Myers | Aug. 9, 1927 |
| 1,756,048 | Williams | Apr. 29, 1930 |
| 1,759,974 | Campbell et al. | May 27, 1930 |
| 2,051,092 | Landis | Aug. 18, 1936 |

FOREIGN PATENTS

| Number | Country | Date |
| --- | --- | --- |
| 665,594 | France | May 7, 1929 |